United States Patent [19]

Toida et al.

[11] 3,917,467

[45] Nov. 4, 1975

[54] PROCESS FOR MANUFACTURING HIGH PURITY METHANE GAS

[75] Inventors: Tsutomu Toida; Seiichi Matsuoka; Kenzo Yamamoto; Kouji Tamura, all of Yokohama, Japan

[73] Assignee: Japan Gasoline Co., Ltd., Tokyo, Japan

[22] Filed: Jan. 8, 1973

[21] Appl. No.: 321,821

[30] Foreign Application Priority Data
Jan. 14, 1972   Japan.................................. 47-5884

[52] U.S. Cl. ......................... 48/197 R; 260/449 M
[51] Int. Cl.² ............................................ C10K 3/04
[58] Field of Search .................... 260/449 M, 449 S; 48/197 R, 206, 214

[56] References Cited
UNITED STATES PATENTS

| | | | |
|---|---|---|---|
| 3,392,218 | 7/1968 | Kalina | 48/197 R |
| 3,429,680 | 2/1969 | Watanabe et al. | 48/214 |
| 3,511,624 | 5/1970 | Humphries et al. | 260/449 M |
| 3,531,267 | 9/1970 | Gould | 48/214 |
| 3,684,689 | 8/1972 | Patton et al. | 48/197 R |
| 3,728,093 | 4/1973 | Cofield | 48/197 R X |
| 3,744,981 | 7/1973 | Ward | 48/197 R |
| 3,753,671 | 8/1973 | Leas et al. | 48/197 R |
| 3,759,679 | 9/1973 | Franz et al. | 260/449 M |
| 3,771,261 | 11/1973 | Mandelik | 48/197 R |

FOREIGN PATENTS OR APPLICATIONS 705,623   3/1954   United Kingdom ............ 260/449 M

*Primary Examiner*—S. Leon Bashore
*Assistant Examiner*—Peter F. Kratz
*Attorney, Agent, or Firm*—Woodhams, Blanchard and Flynn

[57] ABSTRACT

A process for manufacturing high purity methane gas by subjecting a gas mixture mainly comprising methane, hydrogen, carbon monoxide, carbon dioxide and steam to a first methanization reaction step in the presence of a nickel catalyst filled in the reaction zone to methanize a part of the carbon oxides contained therein, then subjecting the gas mixture from the first step to a carbon dioxide-absorption step to remove superfluous carbon dioxide and then subjecting the gas mixture from said absorption step to a second methanization reaction step in the presence of a nickel catalyst filled in the reaction zone to methanize the residual carbon oxides.

3 Claims, No Drawings

PROCESS FOR MANUFACTURING HIGH PURITY METHANE GAS

BACKROUND OF THE INVENTION a. Field of the Invention

The present invention relates to a process for manufacturing high purity methane gas containing substantially no impurity by subjecting a methane-containing gas produced by a gasification reaction such as steam reforming or partial oxidation of hydrocarbons to a combination of steps comprising a multi-stage, particularly two stage, methanization reaction and a carbon dioxide-absorption step.

b. Description of the Prior Art

The gas mixtures obtained by gasification reactions of hydrocarbons generally comprise methane, hydrogen, carbon monoxide, carbon dioxide and steam. Those gas mixtures can be converted to valuable gases such as raw gases for synthesizing various products and high calorific fuel gases (substitute natural gas) by treating them by shift reaction, methanization reaction, carbon dioxide-absorption step, etc.

Many processes for manufacturing the above described high calorific fuel gases from said gas mixture have been disclosed. Particularly, processes for manufacturing high calorific fuel gas by subjecting the gas mixtures to two-stage methanization have been disclosed in the specifications of German Pat. No. 1,110,147, British Pat. No. 791,946 and U.S. Pat. No. 3,511,624. More particularly, in the specification of said U.S. Pat. No. 3,511,624, there is proposed a process for manufacturing high purity methane gas having a methane content higher than 90 vol. %, preferably higher than 95 vol. % by subjecting a gas mixture as above mentioned obtained by gasification of light hydrocarbons in the range of a moderate temperature to two methanization steps and one carbon dioxide absorption step. In this process, such a process flow is employed that the first methanization reaction step is followed by a cooling step for removing a part of steam contained therein and the second methanization reaction step is followed by a carbon dioxide-absorption step for removing carbon dioxide contained therein.

SUMMARY OF THE INVENTION

The present invention relates to a process for manufacturing high purity methane gas by subjecting a gas mixture mainly comprising methane, hydrogen, carbon monoxide, carbon dioxide and steam to multi-stage methanization reaction, characterized by subjecting the gas mixture to a first methanization step in the presence of a nickel catalyst filled in the reaction zone to methanize a part of the carbon oxides under reaction conditions of temperatures of 250°–500°C and pressures ranging from atmospheric pressure to 100 Kg/cm²G, cooling and then subjecting the gas mixture from said step to a carbon dioxide-absorption step to remove the superfluous carbon dioxide contained therein, elevating the temperature and subjecting the gas mixture from this step to a second methanization reaction step in the presence of a nickel catalyst filled in the reaction zone under reaction conditions of temperatures ranging from 200°–400°C and pressures ranging from atmospheric pressure to 100 Kg/cm²G to methanize the residual carbon oxides.

DETAILED DESCRIPTION OF THE INVENTION

As compared with the process flow of the present invention which will be described below, the process flow proposed in said U.S. Pat. No. 3,511,624 is surely more advantageous from the viewpoint of chemical equilibrium for manufacturing methane but the reaction velocity thereof is very slow and the gas mixture to be subjected to the second methanization reaction step has relatively a large volume due to its high carbon dioxide content of, for example, 20 vol. % and, therefore, various disadvantages are caused, for example, the capacities of the methanization reaction vessel and incidental facilities and the quantity of the catalyst to be filled therein must be increased. Further, in said process flow, carbon dioxide must be removed thoroughly in the final step of the carbon dioxide absorption. However, it is to be noted that complete or nearly complete removal of carbon dioxide inexpensively is quite difficult in this step, since the means of removing carbon dioxide employed at present on a commercial scale comprises mere countercurrent contact of the gas mixture containing carbon dioxide with a carbon dioxide-absorbing liquid in an absorption tower. For removing carbon dioxide completely or substantially completely in the absorption tower, the carbon dioxide-absorbing liquid must be increased greatly in quantity or the contact time of the absorbing liquid and the gas mixture must be largely prolonged, since the partial pressure of carbon dioxide in the upper portion of the absorption tower is reduced remarkably or, in other words, the driving force for the carbon dioxide absorption becomes poor. For this purpose, economically disadvantageous, severe operation conditions such as an increase in the capacity of the absorption tower (height of the tower), increase in the circulation velocity of the absorbing liquid and precise regeneration of the absorbing liquid are required.

The present invention provides a process for manufacturing high purity methane gas containing substantially no impurity by employing a process flow free from said disadvantages.

The present invention relates to a process for manufacturing high purity methane gas, characterized by subjecting a gas mixture mainly comprising methane, hydrogen, carbon monoxide, carbon dioxide and steam to a first methanization step in the presence of a nickel catalyst filled in the reaction zone to methanize a part of the carbon oxides under reaction conditions of temperatures of 250°–500°C and pressures ranging from atomspheric pressure to 100 Kg/cm²G, cooling and then subjecting the gas mixture from said step to carbon dioxide-absorption step to remove the superfluous carbon dioxide contained therin, elevating the temperature and subjecting the gas mixture from this step to a second methanization step in the presence of a nickel catalyst filled in the reaction zone under reaction conditions of temperatures ranging from 200°to 400°C and pressures ranging from atmospheric pressure to 100 Kg/cm²G to methanize the residual carbon oxides.

The gas mixtures comprising methane, hydrogen, carbon monoxide, carbon dioxide and steam used as starting material of the process of the invention are preferably those having a methane content higher than 25 vol. %. The gas mixtures may be obtained by gasification reactions, for example, steam reforming and partial oxidation of hydrocarbons. The steam reforming of hydrocarbons comprises reacting the hydrocarbons with steam in a proportion of 0.1 –5.0 moles of steam per one carbon atom of the hydrocarbons preferably in the presence of a nickel catalyst at a reaction temperature of 350°–550°C under a reaction pressure of from atmospheric pressure to 100 Kg/cm²G, if desired adiabatically. In addition to the gas mixtures obtained by the above gasification reactions, other gas mixtures obtained by other processes may be used as the starting material, as far as they comprise mainly methane, hydrogen, carbon monoxide, carbon dioxide and steam.

According to the process of the invention, said gas mixture is introduced in the first methanization reaction step and thereby subjected to the first methanization reaction at a temperature in the range of 250°–500°C under a pressure in the range of from atmospheric pressure to 100 Kg/cm²G. The methanization reaction may be performed in the presence of a usual nickel catalyst used in general methanization reaction. It is particularly preferred to carry out the reaction in the presence of an activated nickel catalyst obtained by reducing at 200°–500°C a catalyst carried on diatomaceous earth which catalyst has been obtained by co-precipitating nickel oxide and 5 –60%, based on nickel oxide, of magnesium oxide and incorporating therein oxides of copper and chromium or oxides of copper chromium and maganese.

The gas mixture from the first methanization reaction step is cooled to a temperature of, for example, 40°–170°C to condense and thereby to remove at least a part of steam prior to the treatment in the next carbon dioxide-absorption step. Degree of cooling of the gas mixture and quantity of steam to be removed may vary freely depending upon operation conditions of the successive step of carbon dioxide absorption.

The gas mixture from which a considerable quantity of steam has been removed by condensation is then introduced in the carbon dioxide-absorption step to remove superfluous carbon dioxide. This carbon dioxide-absorption step is operated so that in the gas mixture to be introduced in the successive second methanization reaction step, carbon dioxide is remained in a quantity counterbalanced with the quantity of hydrogen contained therein or in other words, a quantity that can be converted together with the hydrogen to methane. In this connection, the carbon dioxide removal in this carbon dioxide-removing step may be performed by usual processes such as amine process or hot potassium carbonate process.

The gas mixture from the carbon dioxide-absorption step is heated to 200°–400°C under a pressure in the range of from atmospheric pressure to 100 Kg/cm²G, introduced in the second methanization reaction step and methanized again therein. As catalyst in the second methanization reaction, the same nickel catalyst as in the first methanization reaction may be used. Further, the gas mixture from the second methanization reaction step can be subjected to the third and fourth methanization reaction steps. However, such an additional treatment is usually unnecessary.

The gas mixture obtained by a series of processing steps of the first methanization reaction step, carbon dioxide absorption step and the second methanization step successively is then cooled directly to remove steam therefrom, whereby high purity methane gas having a methane content above 97 vol. % is obtained.

Thus, as compared with the process of U.S. Pat. No. 3,511,624, quantity of the gas mixture to be introduced in the second methanization reaction step is relatively small according to the process of the present invention, since a considerable quantity of carbon dioxide has been removed therefrom. Further, due to smaller partial pressure of steam ($P_{H_2O}$) and also smaller partial pressure of carbon dioxide ($P_{CO_2}$) in the gas mixture, the reaction velocity is higher and, consequently, the catalyst filled in the second methanization reaction zone can be reduced remarkably in quantity.

While various severe conditions are required in the final carbon dioxide-absorption step which follows the two methanization reaction steps according to the conventional processes, the complete removal of carbon dioxide is unnecessary in the carbon dioxide absorption step and the severe conditions in this step may be moderated according to the process of the present invention, since the carbon dioxide absorption step is arranged between the first and the second methanization reaction steps. Consequently, an expense of apparatus of the carbon dioxide absorption step and cost of operation thereof can be reduced remarkably.

A problem posed herein is precipitation of carbon on the caralyst filled in the second methanization reaction step as described also in said U.S. Pat. No. 3,511,624. In U.S. Pat. No. 3,511,624, it is proposed to leave a suitable quantity of steam for solving the problem but quantity thereof is not clearly shown.

Important reasons why carbon is precipitated on the catalyst will be understood from the following reaction formulae:

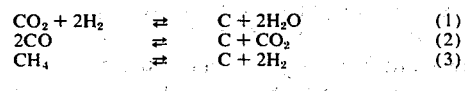

$$CO_2 + 2H_2 \rightleftarrows C + 2H_2O \quad (1)$$
$$2CO \rightleftarrows C + CO_2 \quad (2)$$
$$CH_4 \rightleftarrows C + 2H_2 \quad (3)$$

When the above reactions proceed in the right direction, carbon precipitation is inclined to be caused.

According to the process of the invention, considerable quantities of steam and carbon dioxide are removed from the mixture between the first methanization reaction step and the second methanization reaction step and, therefore, if free energy of formation of the precipitated carbon is 0 (zero) Kcal./mole or if graphite carbon has been formed, carbon precipitation may be caused surely on the catalyst filled in the second methanization reaction zone from viewpoint of chemical equilibrium. However, after intensive investigations of free energy of formation of precipitated carbon in said reaction formulae (1), (2) and (3), the inventors have found that the free energy is above 10 Kcal./mole under temperature condition of below 500°C. On the basis of the finding, the inventors dared eccentrically to subject the gas mixture from which considerable quantities of steam and carbon dioxide had been removed to the second methanization reaction step. As supposed by the inventors, carbon precipitation on the catalyst was not observed.

EMBODIMENT OF THE INVENTION

For illustrating the process of the present invention concretely, a gas mixture comprising methane, hydrogen, carbon monoxide, carbon dioxide and steam was prepared by steam reforming of raw naphtha.

The following steam reforming reaction is for the preparation of a starting gas to be treated by the process of the invention, which by no means limit the invention.

A raw naphtha having average carbon atoms in a molecule of 6.03, IBP of 39°C, FBP of 130°C and specific gravity of 0.67 was mixed with steam in a steam ratio of ($H_2O/C$) of 0.99 mole. The mixture was incorporated in an adiabatic reforming reactor filled with a nickel catalyst at an inlet temperature of 492°C under a pressure of 26.5 Kg/cm$^2$G to effect the steam reforming reaction. Composition of the resulting gas mixture, outlet gas temperature and outlet gas pressure were as shown below:

Gas composition:

| | |
|---|---|
| $CH_4$ | 46.11 vol.% |
| $H_2$ | 9.21 |
| CO | 1.43 |
| $CO_2$ | 15.78 vol. % |
| $H_2O$ | 27.43 |
| Outlet gas temperature: | 535°C |
| Outlet gas pressure: | 22.0 Kg/cm$^2$G |

By using the gas mixture as starting gas, the process of the invention and a prior technique (the process of U.S. Pat. No. 3,511,624 was employed) were performed to obtain the results shown in the following Example and Comparative Example.

EXAMPLE

The gas mixture prepared as above was cooled to a temperature of 252°C and introduced in a first methanization reaction vessel filled with 200 g of a nickel catalyst. The methanization reaction was carried out at a space velocity of 7,000 hr.$^{-1}$. As the nickel catalyst, a catalyst in the form of tablets prepared by precipitating 37% of nickel and 4% of copper, chromium and manganess oxides on a silica carrier and adding 15% of magnesium oxide thereto was used. Composition of the resulting gas mixture, outlet gas temperature and outlet gas pressure were as shown below:

Gas composition:

| | |
|---|---|
| $CH_4$ | 50.28 vol. % |
| $H_2$ | 2.39 |
| CO | 0.04 |
| $CO_2$ | 15.74 |
| $H_2O$ | 31.55 |
| Outlet gas temperature: | 348°C |
| Outlet gas pressure: | 20.8 Kg/cm$^2$G |

The gas mixture from the first methanization reaction vessel was cooled to a temperature of 120°C to remove a considerable quantity of steam contained therein. The mixture was then introduced in a carbon dioxide-absorption tower to remove a considerable quantity of carbon dioxide. Composition of the resulting gas mixture, outlet gas temperature and outlet gas pressure were as shown below:

Gas composition:

| | |
|---|---|
| $CH_4$ | 88.43 vol. % |
| $H_2$ | 4.21 |
| CO | 0.08 |
| $CO_2$ | 1.57 |
| $H_2O$ | 5.71 |
| Outlet gas temperature: | 90°C |
| Outlet gas pressure: | 20.0 Kg/cm$^2$G |

In this connection, if the carbon dioxide absorption step is performed in a practical apparatus under a pressure in the system of 20 atm, the partial pressure of carbon dioxide $P_{CO_2}$ in the upper portion of the carbon dioxide-absorption tower is supposed to be 0.314 atm.

The gas mixture from the carbon dioxide absorption tower was heated to a temperature of 249°C and introduced in a second methanization reactor filled with 50 g of the same nickel catalyst as that filled in the first methanization reaction vessel at a space velocity of 5300 hr.$^{-1}$ under a pressure of 19.6 Kg/cm$^2$G to effect the methanization reaction. Composition of the resulting gas mixture, outlet gas temperature and outlet gas pressure were as shown below:

Gas composition:

| | |
|---|---|
| $CH_4$ | 89.23 vol. % |
| $H_2$ | 1.08 |
| CO | 0 |
| $CO_2$ | 0.85 vol. % |
| $H_2O$ | 7.23 |
| Outlet gas temperature: | 280°C |
| Outlet gas pressure: | 19.0 Kg/cm$^2$G |

Thereafter, the gas mixture from the second methanization reaction vessel was cooled to remove water. The resulting gas mixture had the following composition and outlet gas pressure:

Gas composition:

| | |
|---|---|
| $CH_4$ | 97.88 vol. % |
| $H_2$ | 1.19 |
| CO | 0.00 |
| $CO_2$ | 0.93 |
| $H_2O$ | — |
| Outlet gas pressure: | 18.0 Kg/cm$^2$G |

COMPARATIVE EXAMPLE

The gas mixture from the steam reforming reaction step was introduced in the first methanization reaction vessel charged with 200 g of the same catalyst as in the Example under the same conditions as in the Example to effect the methanization reaction.

As a matter of course, the resulting gas mixture had substantially the same composition, outlet gas temperature and outlet gas pressure as in the Example.

Then, the gas mixture from the first methanization reaction vessel was cooled to a temperature of 120°C to remove a considerable quantity of steam contained therein. Composition, outlet gas temperature and outlet gas pressure of the resulting gas mixture were as shown below:

Gas composition:

| | |
|---|---|
| $CH_4$ | 67.28 vol. % |
| $H_2$ | 3.20 |
| CO | 0.06 |
| $CO_2$ | 21.07 |
| $H_2O$ | 8.39 |
| Outlet gas temperature: | 90°C |
| Outlet gas pressure: | 20.3 Kg/cm$^2$G |

Thereafter, the gas mixture was heated to a temperature of 260°C and introduced in a second methanization reaction vessel charged with 100 g of the same catalyst as in the Example at a space velocity of 3600 hr.$^{-1}$ and a pressure of 19.6 Kg/cm$^2$G to effect the methanization reaction.

Composition of the resulting gas mixture, outlet gas temperature and outlet gas pressure were as shown below:

Gas composition:

| | |
|---|---|
| $CH_4$ | 73.05 vol. % |
| $H_2$ | 0.84 |
| CO | 0.01 |
| $CO_2$ | 15.05 |
| $H_2O$ | 11.05 |
| Outlet gas temperature: | 285°C |
| Outlet gas pressure: | 19.3 Kg/cm²G |

The gas mixture from the second methanization reaction vessel was cooled to remove the condensed water and then introduced in a carbon dioxide absorption tower to remove carbon dioxide contained therein. Composition of the resulting gas mixture and outlet gas pressure were as shown below:

Gas composition:

| | |
|---|---|
| $CH_4$ | 97.85 vol. % |
| $H_2$ | 1.13 vol. % |
| CO | 0.02 |
| $CO_2$ | 1.00 |
| $H_2O$ | — |
| Outlet gas pressure: | 18.0 Kg/cm²G |

In this connection, if the carbon dioxide absorption step is performed in a practical apparatus under a pressure in the system of 20 ata, partial pressure of carbon dioxide $P_{CO_2}$ in the upper portion of the carbon dioxide-absorption tower is supposed to be 0.2 ata.

For facilitating the comparison of the Example with the Comparative Example, the preparation of gas mixtures of nearly the same composition, i.e. high purity methane gas, was aimed in said examples.

The features of the process of the invention will be illustrated with reference to the results of the comparison of the Example and the Comparative Example.

The same apparatus and operation conditions were employed before the first methanization reaction step in both Example and Comparative Example. Comparing the techniques of the Example with Comparative Example with respect to the other steps, the differences as shown in Table 1 were noted.

In Table 1, symbol A represents a quantity of catalyst to be charged in the second methanization reaction vessel, the quantity in the Example being represented as 1 (by weight). Symbol B represents a quantity of the gas to be introduced in the second methanization reaction vessel, the quantity in the Example being represented as 1 (by weight). Symbol C represents partial pressure of carbon dioxide ($P_{CO_2}$) in the upper portion of the carbon dioxide absorption tower, the partial pressure in the Example being represented as 1.

Table 1

| | Example | Comparative Example |
|---|---|---|
| A | 1 | 1.94 |
| B | 1 | 1.32 |
| C | 1 | 0.64 |

As clearly shown A and B in Table 1, according to the process of the present invention, the catalyst to be charged in the second methanization reaction vessel can be reduced in quantity to about one-half of that of the conventional process and, in addition, the gas to be introduced in the second methanization reaction vessel can be reduced in quantity by about 30% and therefore, capacity of the second methanization reaction vessel can be reduced remarkably. Further, according to the process of the present invention, as clearly shown by C in Table 1, partial pressure of carbon dioxide $P_{CO_2}$ in the upper portion of the absorption tower may be relatively high, or in other words, it is unnecessary to remove carbon dioxide thoroughly from the carbon dioxide absorption tower. Consequently, the severe operation conditions in the absorption tower may be moderated advantageously.

What we claim is:

1. A process for manufacturing a high purity methane gas which comprises:

passing a gas mixture consisting essentially of methane, steam, hydrogen, carbon monoxide and carbon dioxide through a first methanization reaction zone under adiabatic methanization reaction conditions of a temperature in the range of 250° to 500°C and a pressure in the range of atmospheric pressure to 100 kg/cm²G and in contact with methanization catalyst to produce a first intermediate gas, cooling said first intermediate gas to a temperature of 40° to 170°C and removing condensed steam therefrom, passing the remainder of said cooled first intermediate gas through a carbon dioxide absorption zone and therein removing from said cooled first intermediate gas all of the carbon dioxide contained therein in excess of the quantity capable of reacting with the hydrogen contained in said first intermediate gas to produce methane, whereby to obtain a second intermediate gas free of excess carbon dioxide, raising the temperature of said second intermediate gas and then passing the entirety of said second intermediate gas through one or more additional methanization reaction zones under adiabatic methanization reaction conditions of a temperature in the range of 200° to 400°C and a pressure in the range of atmospheric pressure to 100 kg/cm² G and in contact with methanization catalyst to methanize the remaining carbon monoxide and carbon dioxide, and obtaining from the last of the methanization reaction zones an effluent gas of high purity methane.

2. A process for manufacturing high purity methane gas according to claim 1, in which said gas mixture fed to the first methanization reaction zone has a methane content above 25 vol. %.

3. A process for preparing high purity methane gas according to claim 1, in which said methanization catalyst is an activated nickel catalyst obtained by reducing at 200°–500°C a catalyst composition carried on diatomaceous earth, said catalyst composition consisting essentially of nickel oxide and 5 – 60 vol. %, based on nickel oxide, of magnesium oxide and further containing oxides of copper and chromium or oxides of copper, chromium and manganese.

* * * * *